Patented Sept. 5, 1939

2,172,308

UNITED STATES PATENT OFFICE 2,172,308

PROCESS FOR THE PRODUCTION OF LIGHT-SENSITIVE MATERIALS FOR COLOR PHOTOGRAPHIC PURPOSES

Béla Gáspár, Brussels-Forest, Belgium

No Drawing. Application February 16, 1938, Serial No. 190,878. In Germany February 20, 1937

9 Claims. (Cl. 95—6)

The present invention relates to a process of producing photographic materials for color photographic purposes which enables insoluble or difficultly soluble dyestuff components to be incorporated in the photographic colloid in a very simple and reliable manner. The process consists in incorporating the desired dyestuff component in the colloid not in the form of the component itself but in the form of a soluble derivative thereof the component being subsequently split off from its derivative dissolved within the colloid. By the term "dyestuff component" is meant any substance capable of forming a dyestuff by reacting or coupling with a second dyestuff component, if necessary after a pretreatment such as, for instance, diazotizing.

The soluble derivative is preferably one that is derived from an organic dyestuff component having an at least bi-valent inorganic atom linked to a carbon atom of the molecule and a radical imparting a salt-forming character hydrolysably linked with the said inorganic atom in which case the splitting off of the component is effected by hydrolysis. More particularly, the bisulfite and aldehyde bisulfite addition products of azo-dyestuff components, the ω-sulphonic acid salts of the amino compounds and the sulphaminic acid salts derived from the dyestuff forming substances containing an amino group are suitable for carrying out this process.

The process of producing light-sensitive materials according to the present invention, therefore, consists in incorporating into the solutions employed for the production of the emulsion, into the emulsion itself or into the finished light-sensitive layer, soluble derivatives of insoluble or difficultly soluble dyestuff components, the said derivatives being split up to give the dyestuff components to be employed in the production of the colored image prior to exposure of the material.

The present invention is generally applicable to the incorporation of insoluble or difficultly soluble dyestuff components in the light-sensitive material whatever be the method subsequently employed for the production of the colored image. Thus, for example, the processes covered by my prior Patents Nos. 2,071,688 and 2,046,067 require the presence of dyestuff components in the light-sensitive layer, the dyestuff employed for the production of the image being formed from these components after exposure. Other processes which require the presence of dyestuff components in the light-sensitive layer have been described, for example, in British specifications Nos. 298,979 (Lierg) and 15055/1912 (Fischer), in both of which the advantage of using insoluble or difficultly soluble dyestuff components is stressed.

Heretofore, water-insoluble dyestuff components have been incorporated into the materials as such, for example, by dissolving them in alcohol and mixing the alcoholic solution with the gelatine solution. Alternatively, salt-forming dyestuff components were used in the form of water-soluble alkali-salts from which the dyestuff component was precipitated. The first of these methods has the disadvantage that upon mixing the alcoholic solution with the gelatine an immediate precipitation of the dyestuff components takes place, this giving a much more uneven precipitation than the process of the present invention, in which precipitation is only brought about after the dyestuff component has become evenly distributed throughout the whole of the emulsion or the gelatine employed for the production of the photographic colloid.

The precipitation of insoluble dyestuff components from the alkali-salts thereof is only possible with a limited group of dyestuff components. On the other hand, the soluble derivatives of the dyestuff components used in carrying out the present invention are substitution products which cannot be reconverted into the soluble derivative after they have once been split up within the layer. Accordingly they may, if necessary, be so chosen that they are not dissolved in the developer.

The splitting up of the soluble derivative in carrying out the present invention is a comparatively slow reaction which extends throughout the whole of the emulsion and/or colloid and consequently the insoluble or difficultly soluble component is produced in a state of very fine subdivision.

Within the expression "insoluble or difficultly soluble dyestuff components" used herein are included not only those dyestuff components which are practically insoluble in water or the emulsion but also those dyestuff components, the solubility of which is insufficient to enable a sufficient quantity for practical use to be dissolved in the emulsion. If, for example, a dyestuff component is soluble in water to the extent of one part in one hundred, then only one-half per cent of the component can be introduced into the emulsion by mixing equal quantities of the solution and the emulsion. The use of a larger amount of water to increase the amount of dyestuff present results in a dilution of the emulsion which is a disadvantage.

As above stated, the light-sensitive materials according to the present invention contain the dyestuff components, after splitting up, in an extremely finely divided state whereby they, despite their insolubility, readily react with the subsequently applied reagents to produce an intense dyeing of the layer. The dyestuff may be produced diffusely throughout the layer or locally at the image or non-image parts thereof according to the particular method employed for the production of the colored image. These stages subsequent to exposure form no part of the present invention.

The following are some examples of readily soluble derivatives of dyestuff components which may be easily split up within the material to give the insoluble or difficultly soluble dyestuff components.

Benzidine is used in the form of the sodium salt of the benzidine-N-N'-dimethyl-ωω'-disulphonic acid

(see Bucherer & Schwalbe, Berichte de Deutschen Chemischen Gesellschaft, 1906 volume 39, page 2805). This derivative is incorporated in the gelatine which is to be used for preparing the emulsion or which is to be added to the light-sensitive emulsion, and the gelatine is then treated with a weak solution (say 1%) of ammonia, sodium carbonate or other alkali. The gelatine in allowed to stand at a temperature of about 40° C. in order that the splitting up may be completed. It is then coagulated, brought into noodle-form, washed and after re-melting is mixed with the light-sensitive emulsion.

In place of benzidine, other amines such as β-naphthylamine, tolidine or dianisidine may be used in the form of the N-methyl-ω-sulphonic acid salts or the homologues obtained, for example, from acetaldehyde-bisulfite or benzaldehyde-bisulfite compounds.

The amines may also be used in the form of sulphaminic acid salts of which naphthylamine sulphaminic acid (Berichte volume 24 pages 360 and 363) may be cited as an example. Such a derivative is split up by means of diluted acid.

Phenol may be used in the form of a phenylsulphonic acid salt such as $C_6H_5O.SO_3Na$ (Verley, Bull. Soc. Chim. de France, part 3, vol. 25, pages 46–49). Naphthol may also be used in the form of the naphthyl sulphonic acid salt and similarly α-dinaphthol in the form of the corresponding sulphonic acid ester.

For the incorporation of difficultly soluble phenols, the esters that these phenols form with bi-valent organic acids may also be used. The salts of such esters have the formula, for example,

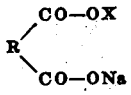

where OX indicates the phenolic residues and R a bi-valent organic radical. Such salts, of which thymol-succinic acid is an example, have been described, inter alia, in German patent specification No. 111297 (Wellcome).

Dyestuff components of the aceto-acetic ester type may be used in the form of their bisulfite compounds. Thus, for example, the isoamyl ester of aceto-acetic acid is difficultly soluble, whilst its bisulfite compounds, which are capable of being split up as herein described, are readily soluble.

Such bisulfite compounds may be prepared in an analogous manner to the preparation of the bisulfite compound of the aceto-acetic ester described by Elion, Recueil des Travaux Chimiques des Pays-Bas, volume 3, page 245.

Aldehydes may also be used as the dyestuff components. Thus for example, 3-nitrobenzaldehyde may be used in the form of its bisulfite compound. The aldehyde yields a red-yellow dyestuff with di-hydrazine-stilbene-disulphonic acid after the splitting up. Corresponding bisulfite compounds of naphthaldehyde are also known (see, for example, Berichte vol. 21 page 259) and the same may be used in the like manner in carrying out the present invention. The splitting up of the addition compounds is effected by means of weak alkalis.

As a further example of the present invention may be cited the use of a dyestuff component which itself has a fairly high solubility in water but which, in order to reduce the aqueous dilution, is used in the form of a still more easily soluble derivative in order that it may be introduced in a higher concentration into the photographic colloid. For example, the di-methyl-di-omega-sulphonic acid sodium salt of Diazo light yellow (Fierz-David 1926 page 154) is used instead of the Diazo light yellow itself. This salt is formed in a manner similar to that of the corresponding benzidine salt above referred to and is split up in the emulsion prior to exposure.

According to a further feature of the present invention the splitting up of the soluble derivatives of the insoluble or difficultly soluble dyestuff components is carried out in the presence of a precipitating agent that yields an insoluble and non-diffusing salt of the dyestuff component set free on the splitting up. By this means the dyestuff component will be fixed in an extremely finely divided state even when dyestuff components which themselves are not completely insoluble are employed. Suitable precipitating agents are, for example, di-phenyl guanidine and quaternary naphthoquinolinium salts.

According to a further feature of the present invention, the splitting up of the soluble derivatives of the dyestuff components is effected in the presence of wetting agents and emulsifying agents. The use of such agents produces an especially fine dispersion of the dyestuff components. Suitable agents for use in carrying out this feature of the present invention are, for example, soap derived from sulphonated castor oil (known in Germany as Monopolseife), fatty acid sulphinates, salts of cholic acid, lignon-sulphonic acid salts, naphthalene sulphonic acid salts and also sapamines. The anion active wetting agents, for example, the fatty acid sulphonates, have been found to be particularly suitable for the dispersion of the acid and phenol type of dyestuff components whilst, on the other hand, sapamine has been found to be a good emulsifying agent for the basic substances such, for example, as benzidine.

The method of the introduction of the dyestuff components will be described by way of an example showing in what manner a component is incorporated into the light-sensitive emulsion using its formaldehyde bisulfite compound.

5 g. of the formaldehyde bisulfite compound of an amine is dissolved in 50 ccm. water at about 70° C. 50 ccm. of a gelatine solution of 20% strength are added with stirring and also 5 ccm. 2-n hydrochloric acid. It is also possible to use alkali instead of the hydrochloric acid for splitting up the formaldehyde bisulfite compound. The gelatine solution is stirred for half an hour at about 50° C. In this case also about twice the quantity of sodium hydroxide may be used afterwards. The gelatine so produced contains the amine set free by the formaldehyde bisulfite compound. The gelatine is later mixed with the photographic emulsion; 5 ccm. of the ordinary blue sensitive unripened emulsion is used, for example, and 1 ccm. of the amine-containing gelatine solution and 2 ccm. of water are also added.

The emulsion so prepared is then poured upon a glass plate or upon another support.

The directions listed above can be used in the introduction of aniline, N-methyl-aniline, alpha-naphthyl-amine, ortho-anisidine by means of the corresponding omega-sulfonic acid.

If the introduction of phenols into gelatine is concerned, the following procedure can be adopted for example. For the purpose of preparing its sulphuric acid ester the di-naphtol already named above is dissolved in pyridine and this solution is added to a solution of chloro-sulphonic acid in pyridine. For example, 11.2 g. dinaphtol and 8 ccm. chloro-sulphonic acid are used and the solution of the dinaphtol is slowly added to the solution of the chloro-sulphonic acid; then the mixture is heated for 5 hours on the water bath; after this the pyridine is distilled off in vacuo and then the remainder is dissolved in an aqueous sodium acetate solution of 27.2% strength out of which the compound crystallizes in long needles on cooling. 0.1 g. of the material thus obtained is dissolved in 12 ccm. of gelatine solution of 20% strength, the dinaphtol compound being added in the form of a solution in 2 ccm. of water and 1 ccm. of 2-n hydrochloric acid. In warming to about 65° C. and in stirring during ½-hour at this temperature the dinaphtol splits itself off. While the sulphuric acid ester of the dinaphtol is incapable of coupling itself with diazo solutions, the gelatine on the other hand has the property of coupling with diazo-solutions after the treatment at an increased temperature in the presence of acid. The gelatine is mixed with a light sensitive emulsion poured on to a glass plate and is converted into dyer layers after the exposure and developing with diazo solutions; from these layers the dyestuff can be removed locally in the known manner for the production of dyestuff images.

In a similar manner that compound which arises when 1 g. of the substance is dissolved in 10 ccm. pyridin and heated with 3 g. of the half-chloride of the m-sulphonic benzoic acid for three hours and then pouring the mixture into water, and then salting out the soluble compound thus formed by means of the addition of sodium chloride, can also be used as a scissible compound of the α di-naphtol.

The invention does not limit itself to the use of the substances given as examples, but can also be used in order to introduce other dyestuff components, as for example diphenylamin, in the form of its soluble scissible compounds, for example the formaldehyde-bisulfite compound, into the gelatine or the emulsion and from this to set free the component before the exposure.

In this case as in other cases the principle of the new process is based on the fact that an insoluble or difficultly soluble dyestuff component is incorporated into the layer in such a way that one of its derivatives is produced which contains a radical which can be split off again; this radical makes the component soluble; before the exposure, the soluble derivative is split up into the original component which then remains in the layer and is used after the exposure for the production of the dyestuff which is to form the image. In general the radical which can be split off consists of a salt-forming group which is linked to the dyestuff component by a hydrolysable linkage. In most cases an inorganic atom forming a part of the component such as for instance the oxygen atom of a phenolic component or a nitrogen atom of an amino or imino-compound brings about the union with the radical which can be split off to form again the phenol or the amino compound.

What I claim is:

1. The method of coloring a photographic material with an azo-dye by incorporating into the colloid used for forming a layer of said material a water insoluble azo-dye component having an inorganic atom, selected from the group consisting of oxygen and nitrogen linked to a carbon atom, and synthesizing the azo-dye within said colloid from said insoluble component, which comprises, the steps of dissolving a derivative of said insoluble azo-dye component in the colloid, said derivative having an acid salt-forming radical in hydrolyzable linkage with said inorganic atom of the azo-dye component, treating said derivative and said colloid simultaneously and prior to the exposure of the photographic material with a hydrolyzing agent which does not adversely affect said colloid and which splits off said insoluble dyestuff component from the soluble derivative.

2. The method of coloring a photographic material with an azo-dye incorporating into the gelatin solution used for forming a layer of said material a water insoluble azo-dye component having an inorganic atom selected from the group consisting of oxygen and nitrogen linked to a carbon atom, and synthesizing the azo-dye within said gelatin layer from said insoluble component, which comprises the steps of dissolving a derivative of said insoluble azo-dye component in the gelatin solution, said derivative having an acid salt-forming radical in hydrolyzable linkage with said inorganic atom of the azo-dye component, treating said derivative and the gelatin simultaneously and prior to pouring with a hydrolyzing agent which does not adversely affect said gelatin solution and which splits off said insoluble dyestuff component from the soluble derivative.

3. The method of coloring a photographic material with an azo-dye by incorporating into the gelatin solution used for forming a light sensitive silver halide gelatin layer of said material a water insoluble azo-dye component having an inorganic atom selected from the group consisting of oxygen and nitrogen linked to a carbon atom, and synthesizing the azo-dye within the layer from said insoluble component, which comprises the steps of dissolving a derivative of said insoluble azo-dye component in the gelatin solution, said derivative having an acid salt-forming radical in hydrolyzable linkage with said inorganic atom of the azo-dye component, mixing the gelatin solution with silver halide, treating said derivative and the silver halide colloid simultaneously and prior to the exposure of the photographic material with a hydrolyzing agent which does not adversely affect said silver halide colloid and which splits off said insoluble dyestuff component from the soluble derivative.

4. The method of coloring a photographic material with an azo-dye by incorporating into the silver halide emulsion used for forming a light sensitive silver halide emulsion layer of said material a water insoluble azo-dye component having an inorganic atom, selected from the group consisting of oxygen and nitrogen linked to a carbon atom, and synthesizing the azo-dye within the layer from said insoluble component, which comprises the steps of dissolving a derivative of said insoluble azo-dye component in the silver halide emulsion, said derivative having an acid salt-forming radical in hydrolyzable linkage with said inorganic atom of the azo-dye component, treating said derivative and said silver halide emulsion simultaneously and prior to the exposure of the photographic material with a hydrolyzing agent which does not adversely affect said silver halide emulsion and which splits off said insoluble dyestuff component from the soluble derivative.

5. In a process of producing photographic materials which includes incorporating a soluble hydrolyzable derivative of an insoluble azo-dye component into a colloid used for the formation of a layer of said photographic material, said azo-dye component having an inorganic atom selected from the group consisting of oxygen and nitrogen linked to a carbon atom of the molecule and said derivative having an acid salt-forming radical linked in hydrolyzable linkage to said inorganic atom, the step which consists in treating said colloid and said derivative, simultaneously and prior to exposure by a hydrolyzing agent which does not adversely affect said colloid.

6. In a process of producing photographic materials which includes incorporating a soluble hydrolyzable derivative of an insoluble azo-dye component into a colloid used for the formation of a layer of said photographic material, said azo-dye component having an inorganic atom selected from the group consisting of oxygen and nitrogen linked to a carbon atom of the molecule and said derivative having an acid salt-forming radical linked in hydrolyzable linkage to said inorganic atom, the step which consists in treating said coloid and said derivative, simultaneously and prior to exposure and in the presence of a wetting agent by a hydrolyzing agent which does not adversely affect said colloid.

7. The method of producing photographic dyestuff images which comprises dissolving a derivative of an insoluble azo dyestuff component within the gelatin solution to be used for the production of a light sensitive silver halide emulsion layer on the support of the photographic material, said azo-dye component having an inorganic atom selected from the group consisting of oxygen and nitrogen linked to a carbon atom of the molecule and said derivative of the component having an acid salt-forming radical in hydrolyzable linkage with said inorganic atom, splitting off the dyestuff component from the dissolved derivative within the gelatin solution by a hydrolyzing agent which does not adversely affect said gelatine solution, mixing the gelatin with silver halide, pouring said emulsion onto the support, exposing the light sensitive layer, developing the silver image, transforming the dyestuff component into an azo dyestuff and destroying the azo dyestuff locally in proportion to the silver deposit.

8. The method of producing photographic dyestuff images which comprises dissolving a derivative of an insoluble azo dyestuff component within the gelatin solution to be used for the production of a light sensitive silver halide emulsion layer on the support of the photographic material, said azo-dye component having an inorganic atom selected from the group consisting of oxygen and nitrogen linked to a carbon atom of the molecule and said derivative of the component having an acid salt-forming radical in hydrolyzable linkage with said inorganic atom, mixing the gelatin with a silver halide, splitting off the dyestuff component from the dissolved derivative within the silver halide emulsion by a hydrolyzing agent which does not adversely affect said silver halide emulsion, pouring the said emulsion onto the support, exposing the light sensitive layer, developing the silver image and transforming the component into an azo dyestuff image.

9. The method of producing photographic dyestuff images which comprises dissolving the derivative of an insoluble dyestuff component within the gelatin solution to be used for the production of a light sensitive silver halide emulsion layer on the support of the photographic material, said dyestuff component having an inorganic atom selected from the group consisting of oxygen and nitrogen linked to a carbon atom of the molecule and said derivative having an acid salt-forming radical in hydrolyzable linkage with said inorganic atom, splitting off the dyestuff component from the dissolved derivative within the gelatin solution by a hydrolyzing agent which does not adversely affect the gelatin solution, mixing the gelatin with silver halide, pouring the said emulsion onto the support, exposing the light sensitive layer, developing the silver image and transforming the component into a dyestuff image.

BÉLA GÁSPÁR.